US012064989B2

(12) United States Patent
Marschand et al.

(10) Patent No.: US 12,064,989 B2
(45) Date of Patent: Aug. 20, 2024

(54) WRITING INSTRUMENTS AND ASSOCIATED METHODS

(71) Applicant: Sanford, L.P., Atlanta, GA (US)

(72) Inventors: Bret Ryan Marschand, Glen Ellyn, IL (US); Wing Sum Vincent Kwan, Chicago, IL (US)

(73) Assignee: Sanford, L.P., Atlanta, GA (US)

( * ) Notice: Subject to any disclaimer, the term of this patent is extended or adjusted under 35 U.S.C. 154(b) by 88 days.

(21) Appl. No.: 17/398,712

(22) Filed: Aug. 10, 2021

(65) Prior Publication Data

US 2021/0362533 A1 Nov. 25, 2021

Related U.S. Application Data

(63) Continuation of application No. 16/647,928, filed as application No. PCT/US2018/051869 on Sep. 20, 2018, now Pat. No. 11,110,738.

(Continued)

(51) Int. Cl.
*B43K 8/06* (2006.01)
*B43K 1/12* (2006.01)
(Continued)

(52) U.S. Cl.
CPC .................. *B43K 8/06* (2013.01); *B43K 1/12* (2013.01); *B43K 8/022* (2013.01); *B43K 8/03* (2013.01)

(58) Field of Classification Search
CPC ... B43K 8/06; B43K 8/08; B43K 8/03; B43K 8/022; B43K 1/006; B43K 1/12
See application file for complete search history.

(56) References Cited

U.S. PATENT DOCUMENTS 3,292,595 A * 12/1966 Young ...................... B43K 8/18 401/259
3,969,027 A * 7/1976 Randar .................... B43K 8/02 401/292

(Continued)

FOREIGN PATENT DOCUMENTS

CN 115765239 * 3/2023
CN 218717129 * 3/2023

(Continued)

OTHER PUBLICATIONS

International Search Report and Written Opinion for International Application No. PCT/US2018/51869 mailed Jan. 29, 2019 (14 pages).

(Continued)

*Primary Examiner* — J C Jacyna
(74) *Attorney, Agent, or Firm* — Eversheds Sutherland (US) LLP

(57) ABSTRACT

Embodiments of the disclosure can include writing instruments, nibs for writing instruments, and methods of making the same. In one embodiment, the writing instrument includes a reservoir; an ink solution comprising a pigment, the ink solution being housed within the reservoir; a nib disposed at an end of the reservoir and plugging an opening of the reservoir such that the reservoir is closed, wherein a tip of the nib extends outside of the reservoir; and a filament extending within the reservoir, the filament being in fluid communication with a portion of the nib within the reservoir, such that the ink solution travels along the filament and through the nib, by capillary action, wherein the nib and filament are formed such that no more than 50 percent of the pigment present in the nib and filament flow into the reservoir outside of the nib and filament when the writing instrument is stored with the nib up for a period of one day.

8 Claims, 3 Drawing Sheets

Related U.S. Application Data

(60) Provisional application No. 62/563,134, filed on Sep. 26, 2017.

(51) Int. Cl.
*B43K 8/02* (2006.01)
*B43K 8/03* (2006.01)

(56) References Cited

U.S. PATENT DOCUMENTS

| | | | | | |
|---|---|---|---|---|---|
| 4,749,618 | A * | 6/1988 | Kawaguchi | B43K 1/12 | 428/397 |
| 4,923,317 | A * | 5/1990 | Bishop | B43K 8/02 | 401/199 |
| 5,607,766 | A * | 3/1997 | Berger | A24D 3/08 | 428/36.9 |
| 5,885,020 | A | 3/1999 | Rossi | | |
| 6,171,381 | B1 | 1/2001 | Yoshimura | | |
| 6,629,798 | B1 | 7/2003 | Fukami et al. | | |
| 7,364,614 | B2 | 4/2008 | Kwan et al. | | |
| 2002/0025214 | A1 | 2/2002 | Korper | | |
| 2003/0194260 | A1* | 10/2003 | Ward | D01F 8/12 | 401/199 |
| 2003/0215281 | A1 | 11/2003 | Sexton et al. | | |
| 2005/0137419 | A1* | 6/2005 | Kawami | C07C 319/24 | 568/21 |
| 2005/0186013 | A1 | 8/2005 | Oike | | |
| 2008/0063463 | A1 | 3/2008 | Hori | | |
| 2008/0145136 | A1 | 6/2008 | Korper | | |
| 2014/0272141 | A1 | 9/2014 | Kwan | | |
| 2015/0367672 | A1* | 12/2015 | Kamitani | B43K 8/04 | 401/198 |
| 2016/0246391 | A1* | 8/2016 | Yamada | G06F 3/03545 | |
| 2020/0031754 | A1* | 1/2020 | Tindale | C07C 231/12 | |

FOREIGN PATENT DOCUMENTS

| | | | | |
|---|---|---|---|---|
| FR | 1462004 | * | 12/1966 | B43K 1/12 |
| JP | 2005254549 | * | 9/2005 | |
| JP | 2014037074 | * | 2/2014 | |

OTHER PUBLICATIONS

Extended European Search Report, issued by the European Patent Office, Application No. 18 862 654.3, dated May 3, 2021 (9 pages).

* cited by examiner

WRITING INSTRUMENTS AND ASSOCIATED METHODS

CROSS-REFERENCE TO RELATED APPLICATIONS

This application is a continuation of U.S. patent application Ser. No. 16/647,928, filed Mar. 17, 2020, which is a U.S. national stage application of International Application No. PCT/US2018/051869, filed Sep. 20, 2018, which claims the benefit of priority to U.S. Provisional Application No. 62/563,134, filed Sep. 26, 2017, the disclosures of which are incorporated herein by reference in their entirety.

FIELD OF THE DISCLOSURE

This disclosure relates generally to writing instruments and associated methods and kits.

BACKGROUND

Certain capillary-type writing instruments, such as markers and pens, suffer from ink drain back issues when they are stored tip up. Specifically, pigments within the ink have a tendency to drain back into the reservoir and out of the nib and filament/filter when the instrument is stored nib-up. As a result, little to no color is delivered when a user attempts to write with the writing instrument and the user believes the ink has dried up and the marker or pen is inoperative. Positional storage issues also result when writing instruments are stored tip down for an extended duration. In particular, the pigment pools in the tip and causes it to clog. As a result, the nibs become saturated with pigment such that they no longer write.

Thus, there is a need for writing instruments and components having improved resistance to positional storage issues.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. In some figures, the relative size of certain elements and/or components exaggerated for ease of illustration. Throughout this disclosure, depending on the context, singular and plural terminology may be used interchangeably.

SUMMARY

In some embodiments of the present disclosure, a writing instrument is provided which includes a reservoir; an ink solution comprising a pigment, the ink solution being housed within the reservoir; a nib disposed at an end of the reservoir and plugging an opening of the reservoir such that the reservoir is closed, wherein a tip of the nib extends outside of the reservoir; and a filament extending within the reservoir, the filament being in fluid communication with a portion of the nib within the reservoir, such that the ink solution travels along the filament and through the nib, by capillary action, wherein the nib and filament are formed such that no more than 50 percent of the pigment present in the nib and filament flow into the reservoir outside of the nib and filament when the writing instrument is stored with the nib up for a period of one day.

In some embodiments of the present disclosure, a writing instrument is provided which includes a reservoir; an ink solution comprising a flake-shaped pigment having a major dimension of from about 6 microns to about 8 microns, the ink solution being housed within the reservoir; an acrylic nib comprising a melamine resin, the nib being disposed at an end of the reservoir and plugging an opening of the reservoir such that the reservoir is closed, the nib comprising fibers having a thickness of from about 5 denier to about 7 denier and having a porosity of from about 0.63 to about 0.65, wherein a tip of the nib extends outside of the reservoir; and a filament extending within the reservoir, the filament being in fluid communication with a portion of the nib within the reservoir, such that the ink solution travels along the filament and through the nib, by capillary action, wherein the nib and filament are formed such that no more than 35 percent of the pigment present in the nib and filament flow into the reservoir outside of the nib and filament when the writing instrument is stored with the nib up for a period of one day.

In some embodiments of the present disclosure, a method of making a nib for a writing instrument is provided, including forming a nib material; and cutting the nib material, via a blade, to form a nib having a nib tip.

In some embodiments of the present disclosure, a method of making a nib for a writing instrument is provided including laser cutting or machining at least one channel having a diameter of from about 50 microns to about 150 microns in a nib material, to form a nib having the at least one channel extending over a length of the nib.

In some embodiments, a method of making a non-fibrous nib for a writing instrument is provided, including melt molding a plurality of polymer beads to form a porous nib.

DETAILED DESCRIPTION

Writing instruments and nibs that solve one or more of the above-described problems are provided herein, along with associated methods. These writing instruments and nibs may be designed to prevent drain back of pigments within the ink.

Figure 1:
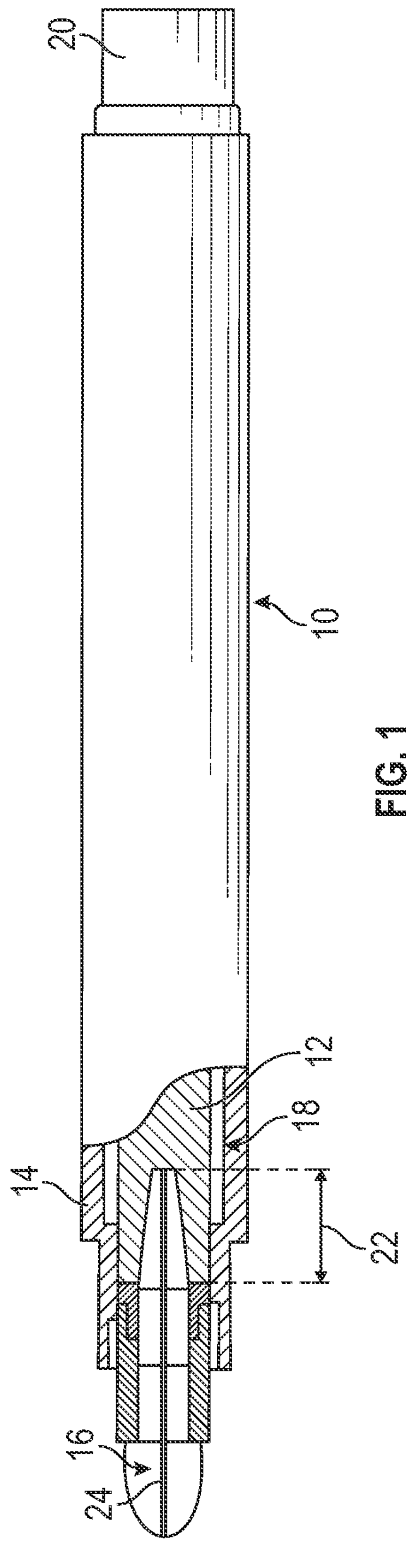
FIG. 1 illustrates a writing instrument according to an embodiment of the present disclosure.

In certain embodiments, as shown in FIG. 1, a writing instrument 10 includes a reservoir 18, an ink solution containing a pigment housed within the reservoir 18, a nib 16 disposed at an end of the reservoir 18 and plugging an opening of the reservoir 18 such that the reservoir is closed (i.e., sealed), such that a tip of the nib 16 extends outside of the reservoir 18, and a filament 12 extending within the reservoir 18, the filament 12 being in fluid communication with a portion of the nib 16 within the reservoir 18, such that the ink solution travels along the filament 12 and through the nib 16, by capillary action. In certain embodiments, the ink solution further contains a polyvinyl butyral (PVB) resin. In certain embodiments, the nib 16 further includes a channel 24 extending along the length of the nib.

In some embodiments, the reservoir 18 is defined by housing or barrel 14. For example, the reservoir 18 may be formed by an elongated, substantially cylindrical barrel 14, such as a plastic barrel. In some embodiments, the reservoir is further sealed by a plug 20, which helps to keep the filament 12 in place.

In certain embodiments, the filament 12 and the nib 16 are disposed in such a manner relative to each other that the ink composition can be transferred from the filament 12 to the nib 16 via migration. In FIG. 1, for example, the filament 12 and the nib 16 are shown to be in substantial contact with each other at a coupling zone 22. A change in pressure at the coupling zone 22 (either in the filament 12 or at the nib 16) can pull the ink composition stored in the filament 12 across the coupling zone 22 to the nib 16. The ink composition generally moves by capillary action within the filament 12, i.e., the ink composition generally moves by capillary action from the distal end of the filament 12 to the filament end which is proximate to the nib 16. Similarly, the ink composition generally moves within the nib 16 by capillary action, i.e., the ink composition generally moves by capillary action from the portion of the nib 16 which is proximate to the filament 12 to the portion of the nib (i.e., the tip) which is applied to a writing surface to make a written mark. In some embodiments, the filament 12 is a wick-type filament and the nib 16 is a porous nib that is in continuous (i.e., permanent) contact therewith. In some embodiments, the filament and the nib are integral.

In certain embodiments, the filament 12 is formed from suitable fibers having an open structure suitable for transporting ink. For example, suitable filaments have a reservoir fiber density less than about 0.50 gram/cubic centimeter (g/cc), such as less than about 0.25 g/cc, or less than about 0.10 g/cc. The filament fibers can be manufactured from natural or thermoplastic materials such as, for example, cotton, polyesters, nylons, polypropylenes, and mixtures thereof. The fibers inside the filament can be linearly-oriented or entangled. To maintain the integrity of the filament against aggressive solvents, the reservoir may be wrapped with a sheet of polypropylene or nylon. The filaments may be of any dimensions as long as the dimensions are sufficient for storing a predetermined amount of ink and for permitting the filament to fit into the desired body or housing 14.

The nib may be any suitable porous or otherwise open structure that is compatible with (i.e., insoluble in) the ink composition and capable of retaining the ink composition. In some embodiments, the nib is formed from a plurality of fibers, although other types of suitable nibs are described below. The fibers of the nib may be manufactured from polymers such as, for example, acrylic, polyester, polypropylene, nylon, and mixtures thereof. In certain embodiments, the nib fibers are bound by a second resin, which also should be insoluble in the ink composition solvent system. Exemplary resins include polyacetal and melamine.

In embodiments of the present disclosure, the nib and filament are formed such that no more than 50 percent of the pigment present in the nib and filament flow into the reservoir outside of the nib and filament when the writing instrument is stored with the nib up for a period of one day. That is, the nib and/or filament may be formed from materials, sized, and shaped such that the gravity-driven flow of the pigments within the ink solution is limited to no more than 50 percent of the pigment present in the nib and filament flowing out of the nib and filament and into the surrounding reservoir (i.e., drain back), when the writing instrument is stored writing tip up for a period of one day. As will be discussed in greater detail below, the nib and filament may be formed such that no more than 35 percent, or even 20 percent, of the pigment present in the nib and filament flow into the reservoir outside of the nib and filament when the writing instrument is stored with the nib up for a period of one day.

Various nib and filament designs that achieve the desired drain back resistance have been developed. These nib and filament designs may be used with a variety of pigments, and may be tailored based on the pigment density, size (i.e., average pigment particle size), and shape (e.g., flake, spear, sphere). For example, the pigment has a major dimension of from about 1 micron to about 15 micron, such as from about 1 micron to about 8 micron, or from about 6 micron to about 8 micron. In certain embodiments, the pigment contains aluminum or another metal. In certain embodiments, the pigments are thermochromic having a major dimension in the range of about 1 to about 2 microns.

In a first embodiment, the nib and filament design to reduce drain back involves using a particular blend of fibers and resin in the nib to obtain a specific porosity. For example, the nib may have a porosity of about 0.5 to about 0.8, such as from about 0.63 to about 0.7, such as from about 0.63 to about 0.65. For example, the nib may contain fibers having a thickness of from about 2 denier to about 20 denier, such as from about 2 denier to about 10 denier, such as from about 5 denier to about 7 denier. In some embodiments, the nib contains fibers having a thickness of 5 denier, 7 denier, or a combination of 5 denier and 7 denier. For example, the filament may be formed from cotton and the nib may be formed from a porous polymeric material, such as a combination of acrylic fibers and melamine resin.

As used, herein "denier" refers to the linear mass density of the fibers, and may be measured according to the following equation $$\varnothing = \sqrt{\frac{4.444\times 10^{-6}\cdot \text{denier}}{\pi\rho}}$$

where Ø is the diameter of the fiber; ρ is the density of the fiber plastics; and denier is the denier.

In one embodiment, a writing instrument includes an ink solution containing a flake-shaped pigment having a major dimension of from about 6 microns to about 8 microns, and an acrylic nib containing a resin and fibers having a thickness of from about 5 denier to about 7 denier and having a porosity of from about 0.63 to about 0.65, wherein the nib and filament are formed such that no more than 35 percent of the pigment present in the nib and filament flow into the reservoir outside of the nib and filament when the writing instrument is stored with the nib up for a period of one day.

In another embodiment, the nib and filament design to reduce drain back involves modifying the nib manufacturing process. In one embodiment, a method of making a nib for a writing instrument includes forming a nib material and cutting the nib material, via a blade, to form a nib having a nib tip. For example, the nib material be include fibers having a thickness of from about 2 denier to about 20 denier, such as from about 2 denier to about 10 denier, or from about 5 denier to about 7 denier.

The nib may be formed of any suitable materials disclosed herein. In certain embodiments, the nib material is a porous polymeric material. For example, the nib material may have a porosity of about 0.5 to about 0.8, such as of about 0.63 to about 0.7. In certain embodiments, the nib material includes a melamine resin and acrylic fibers.

It has been discovered that using a cutting process, as opposed to conventional grinding or shaving processes, to form the nib tip, decreases the amount of heat generated during formation of the nib tip such that a smaller diameter fiber can be used and/or formation of a film on the nib tip (i.e., by melting of the resin) can be substantially prevented, allowing for improved ink flow through the nib tip and/or reduced drain back (due to the fibers being closer together).

In another embodiment, the nib and filament design to reduce drain back involves manufacturing the nib from a plurality of thermoplastic beads. For example, a non-fiber nib may be formed by molding a plurality of thermoplastic beads to achieve a desired nib porosity. For example, a method of making a non-fibrous nib for a writing instrument may include melt molding a plurality of polymer beads to form a porous nib. In certain embodiments, a nib formed via this method has a porosity of about 0.5 to about 0.8, such as from about 0.63 to about 0.7. For example, this method may provide tortuous channels within the nib that reduce the amount of drain back.

In other embodiments, a method of making a nib for a writing instrument includes laser cutting or otherwise machining at least one channel having a diameter of from about 50 microns to about 150 microns in a nib material, to form a nib having the at least one channel extending over a length of the nib. For example, the channel may have a diameter of from about 50 microns to about 150 microns and extending over a length of the nib, such as a diameter of from about 95 microns to about 105 microns, or about 100 microns. The nib may include a single channel or a plurality of channels lengthwise through the tip. It is believed that these channels allow the nib to both deliver and prevent drain back for large pigmented inks.

EXAMPLES

In a first experimental example, metallic inks having an aluminum pigment sized from about 6 to 8 microns in a major dimension were tested. The density and size of this pigment was observed to result in significant drain back during tip up storage in conventional writing instruments. For example, as shown in Table 1 below, drain back using a high performing nib without the implementation of the drain back reducing concepts described herein reached 50% draining of the ink into the reservoir within a period of 1.5 hours. Thus, the pigment migration during tip up storage was observed to be significant over only a short period.

TABLE 1

| Ink Drain Back | | | | | | | |
|---|---|---|---|---|---|---|---|
| | | Remaining Ink % (Sample Size, N = 5) | | | | | |
| Nib | Denier | 0 hours | ½ hour | 1.5 hours | 24 hours | 42 hours | 66 hours |
| Nib 1 | 10 | 100% | 57% | 50% | 43% | 43% | 43% |

Next, as shown in Table 2 below, combinations of the nib porosity versus nib fiber denier (diameter) for a 7 micron nominally sized pigment were tested for drain back.

TABLE 2

| Ink Drain Back for Various Nib Porosities and Deniers | | | | | | |
|---|---|---|---|---|---|---|
| Nib Porosity | 3 Denier Nib | 3/5 Denier Nib | 5 Denier Nib | 5 Denier Nib (Harder Resin-Standard that includes additive) | 5/7 Denier Nib (Harder Resin-Standard that includes additive) | 7 Denier Nib (Harder Resin-Standard that includes additive) |
| 60% | DB | DB | DB | DB | DB | DB |
| 63% | DB | DB | M | M | X | DB |
| 65% | DB | DB | M | M | M | X |
| 68% | DB | M | DB | X | M | DB |
| 70% | M | M | DB | X | M | DB |

The boxes marked with an X indicate combinations of nib porosity and denier where the marker will write well tip down to achieve good color intensity. The boxes marked DB indicate combinations of nib porosity and denier which were found to experience drain back. The boxes marked with an M were found to exhibit moderate drain back. Thus, it was determined that a 5/7 denier nib with 63% porosity along with a 5 denier nib with 68-70% porosity produce good drain back results with a 7 micron nominally sized colored metallic pigment. Further, it was determined that using a relatively harder resin (e.g., melamine resin) to produce the acrylic nib provided improved drain back reduction. Without being restricted to a single theory, it is postulated that harder resin resulting from a higher degree of cross-linking reduces the sizes of the channel inside the nib, and consequently increases its tortuousness. Without intending to be bound by any particular theory, it is believed that the increased tortuousness helps reduce the drain back of the pigment when the marker is placed in a tip up orientation.

Figure 2:
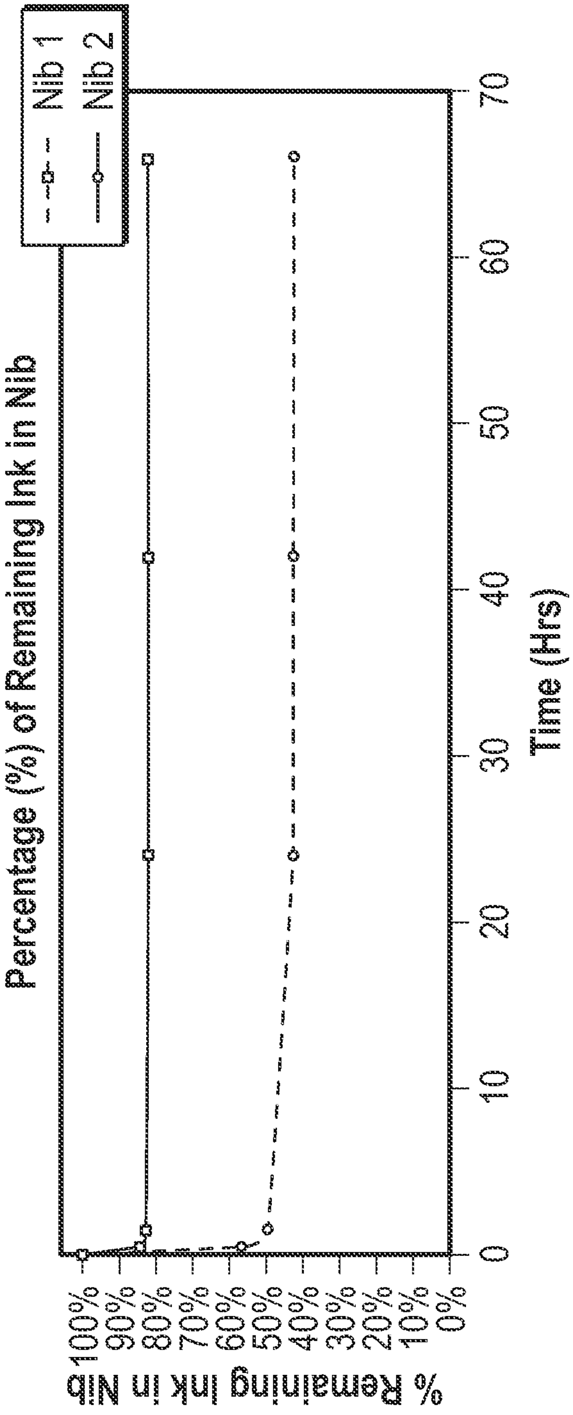
FIG. 2 is a graph illustrating the remaining ink in various nibs over time when stored tip up.

Next, as shown in FIG. 2 and Table 3 below, a comparison between the drain back over time using nibs having different deniers was conducted.

TABLE 3

| Ink Drain Back in Different Denier Nibs | | | | | | | |
|---|---|---|---|---|---|---|---|
| | | Remaining Ink % (Sample Size, N = 5) | | | | | |
| Nib | Denier | 0 hours | ½ hour | 1.5 hours | 24 hours | 42 hours | 66 hours |
| Nib 1 | 10 | 100% | 57% | 50% | 43% | 43% | 43% |
| Nib 2 | 5/7 Blend | 100% | 84% | 83% | 82% | 83% | 83% |

As can be seen, the 5/7 blend denier nib displayed significantly lower drain back over time, with a total drain back of less than 20% over 66 hours when stored tip up. In comparison, a 10 denier nib display a drain back of 50% of the ink after only 1.5 hours. These tests were conducted with a 7 micron pigment of metal which is flake shaped, large and has a relatively high density.

Figure 3:
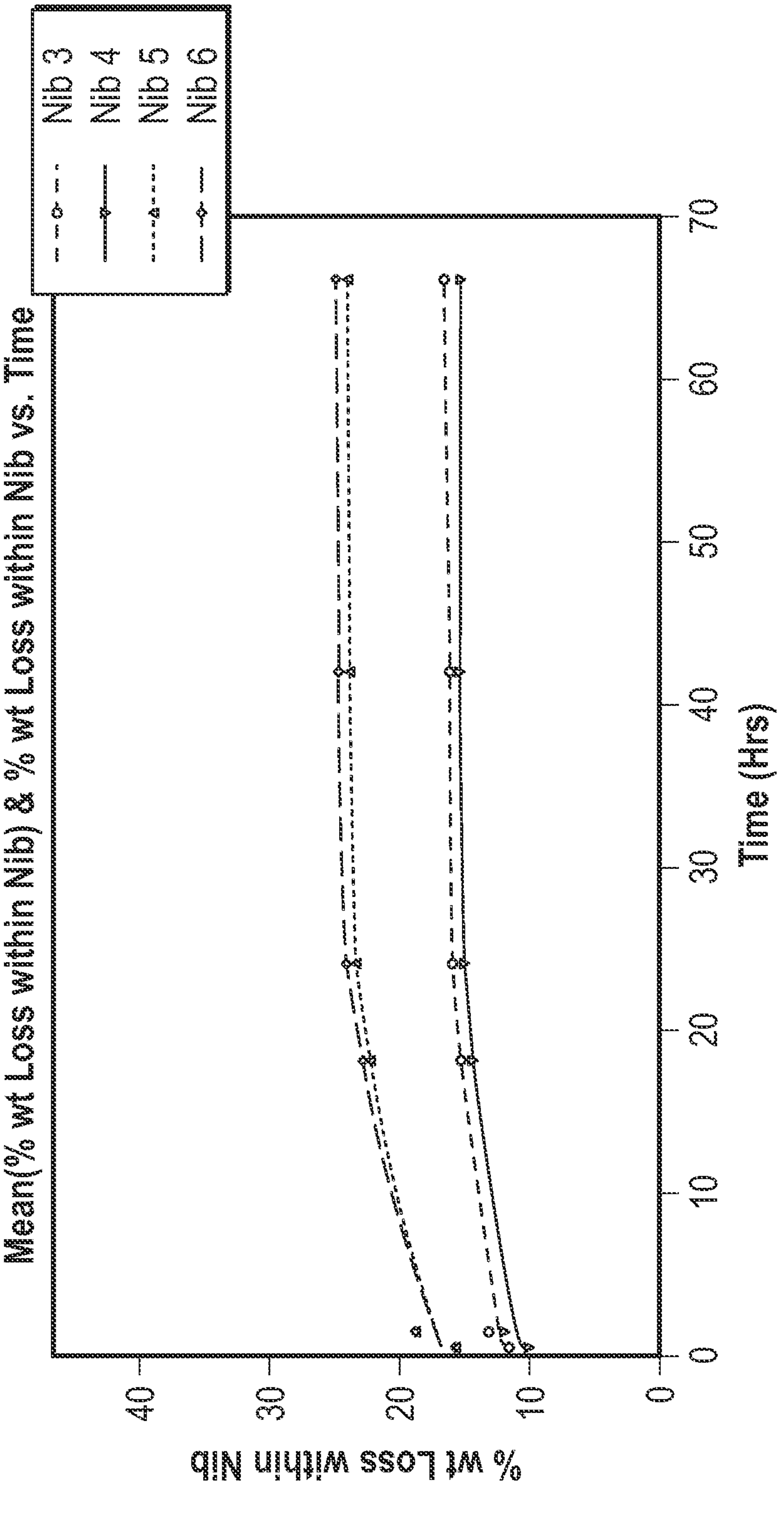
FIG. 3 is a graph illustrating the percent weight loss in various nibs over time when stored tip up.

Next, various 5/7 denier blended fiber nibs having distinct arrangements of fibers within the nib cross-section were tested. The results are shown in Table 4 below and FIG. 3.

TABLE 4

| Ink Loss over Time for 5/7 Denier Nibs | | | | | | |
|---|---|---|---|---|---|---|
| | Ink Loss in Nib (%) at Time (hrs) N = 5 | | | | | |
| Nib Type | 0.5 | 1.5 | 18 | 24 | 42 | 66 |
| Nib 3 | 11.88 | 13.22 | 15.44 | 16.18 | 16.46 | 16.94 |
| Nib 4 | 10.18 | 12.12 | 14.64 | 15.56 | 15.66 | 15.76 |
| Nib 6 | 15.96 | 18.94 | 23.02 | 24.48 | 25.02 | 25.24 |
| Nib 5 | 15.84 | 18.88 | 22.56 | 23.68 | 24.18 | 24.4 |

As is shown, it was determined that an ink loss of no more than 30-35%, and even no more than 15% of ink from the nib over one day, when stored tip up, is possible. Further, it was found that the tortuousness of the nib fiber arrangement aids in preventing drain back.

Next, the effect of using a nib cutting process instead of a traditional stone grinding process to form the nib tip was studied. It was found that the stone grinding process builds up heat that melts the resin used to bind the fibers together, such that a film skin forms on the outside of the nib that prevents pigments from passing through in the tip down orientation. Slowing the heat buildup in the grinding process was discovered to reduce the skinning effect. In particular, it was discovered that blade cutting the front and back of the nib eliminates the skinning effect altogether and allows us to use a smaller denier fiber diameter to pass the same sized pigments. Thus, it was found that smaller denier fibers can be used to deliver pigments when the front and back of the nib are cut using a blade.

Overall, it has been discovered that migration of pigments in inks stored in a writing instrument in a tip up orientation is a significant issue that can be solved by a number of concepts, as described herein. For heavy metallic pigments, it was discovered that a pigment that wanted to drain back almost completely in 30 minutes could unexpectedly be made to display good writing performance when stored tip up for a 4-week period. Thus, the consumer is able to store the writing instrument in any orientation without experiencing significant positional storage issues.

It will be apparent to those skilled in the art that various modifications and variations can be made to the present disclosure without departing from the spirit and scope of embodiments of the disclosure. Thus, it is intended that the described embodiments cover the modifications and variations of the disclosure provided they come within the scope of the appended claims and their equivalents.

What is claimed is:

1. A method of making a nib for an ink-based writing instrument, comprising:

forming a nib material; and cutting the nib material, via a blade, to form a nib having a nib tip;

wherein the nib material has a porosity of 0.5 to 0.65; and wherein the nib has at least one channel positioned within and extending a length of the nib, the at least one channel having a diameter of from about 50 microns to about 150 microns.

2. The method of claim 1, wherein the nib material comprises fibers having a thickness of from about 2 denier to about 20 denier.

3. The method of claim 1, wherein the nib material comprises fibers having a thickness from about 2 denier to about 10 denier.

4. The method of claim 1, wherein the nib material comprises fibers having a thickness of from about 5 denier to about 7 denier.

5. The method of claim 1, wherein the nib material is a porous polymeric material.

6. The method of claim 1, wherein the nib material comprises a melamine resin and acrylic fibers.

7. The method of claim 1, wherein the nib material has a porosity of 0.55 to 0.65.

8. The method of claim 1, wherein the nib material has a porosity of 0.63 to 0.65.

* * * * *